United States Patent
Hortig et al.

(10) Patent No.: US 9,014,869 B2
(45) Date of Patent: Apr. 21, 2015

(54) COMMUNICATION CONVERTER FOR CONNECTING AN AUTOMATION DEVICE TO A COMPUTER AND METHOD FOR CONTROLLING THE COMMUNICATION CONVERTER

(75) Inventors: Michael Hortig, Neu-Isenburg (DE); Philippe Goutaudier, Aschaffenburg (DE); Jun Ye, Shanghai (CN); Qing Li, Shanghai (CN)

(73) Assignee: Schneider Electric Automation GmbH, Seligenstadt (DE)

( * ) Notice: Subject to any disclaimer, the term of this patent is extended or adjusted under 35 U.S.C. 154(b) by 453 days.

(21) Appl. No.: 13/499,752

(22) PCT Filed: Oct. 1, 2010

(86) PCT No.: PCT/EP2010/064668
§ 371 (c)(1),
(2), (4) Date: Apr. 23, 2012

(87) PCT Pub. No.: WO2011/039355
PCT Pub. Date: Apr. 7, 2011

(65) Prior Publication Data
US 2012/0209447 A1      Aug. 16, 2012

(30) Foreign Application Priority Data

Oct. 2, 2009   (DE) .......................... 10 2009 044 172

(51) Int. Cl.
*G05D 11/00*      (2006.01)
*G06F 13/40*      (2006.01)
*G06F 1/26*        (2006.01)
*G06F 13/38*      (2006.01)

(52) U.S. Cl.
CPC ............ *G06F 13/4027* (2013.01); *G06F 1/266* (2013.01); *G06F 13/387* (2013.01); *G06F 2213/3852* (2013.01)

(58) Field of Classification Search
USPC .............................. 700/298; 710/315; 385/24
See application file for complete search history.

(56) References Cited

U.S. PATENT DOCUMENTS

2002/0097953 A1 *  7/2002  Kline ............................. 385/24
2005/0262285 A1    11/2005  Kang
(Continued)

FOREIGN PATENT DOCUMENTS

CN          2752858 Y        1/2006

OTHER PUBLICATIONS

Chinese Search Report issued Mar. 12, 2014, corresponding to Chinese Patent Application 201080044000.1; with English Translation.

*Primary Examiner* — Robert Fennema
*Assistant Examiner* — Anthony Whittington
(74) *Attorney, Agent, or Firm* — Ladas & Parry LLP

(57) ABSTRACT

A communication converter for connecting automation devices having different operating voltages to a host computer, including an interface component and a transceiver component coupled to the interface component, the interface component being connected on the input side via a host connector to a host interface of the host computer and the transceiver component being connected via a device connector to a device interface of the automation device, and a voltage transformer, which on the input side is connected via the host interface to an operating voltage and on the output side to a voltage supply line of the device interface. So the communication converter can communicate with devices having different interface standards, the converter has a first current/voltage measuring unit, a second current/voltage measuring unit, and a switching device.

9 Claims, 3 Drawing Sheets

(56) References Cited

U.S. PATENT DOCUMENTS

Figure 1:
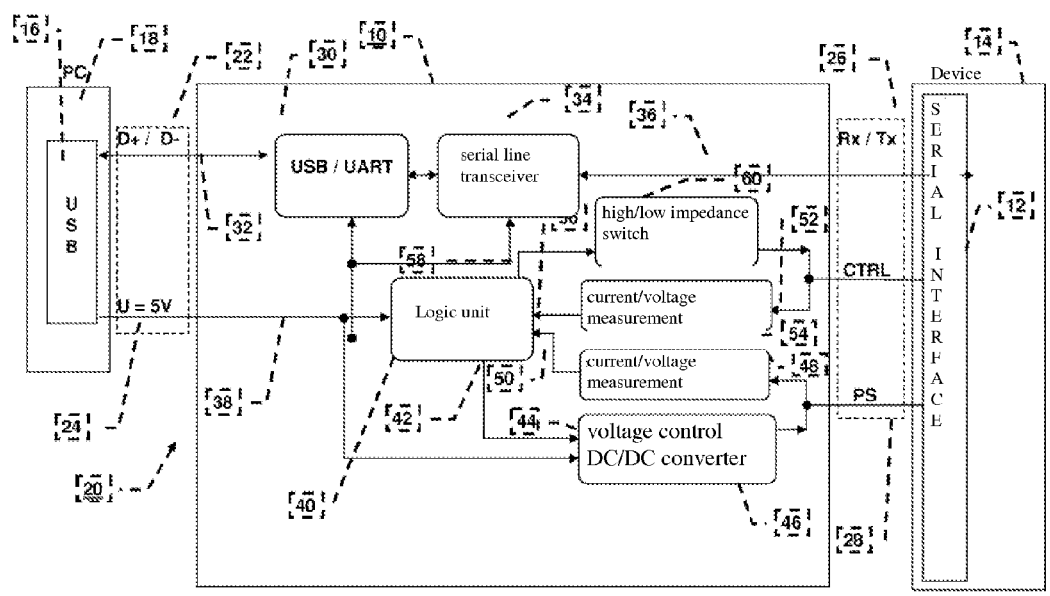

| | | | |
|---|---|---|---|
| 2005/0268000 A1* | 12/2005 | Carlson | 710/15 |
| 2006/0080476 A1* | 4/2006 | Wang et al. | 710/15 |
| 2006/0155908 A1* | 7/2006 | Rotvold et al. | 710/315 |
| 2009/0070615 A1* | 3/2009 | Maggiolino et al. | 713/340 |

* cited by examiner

COMMUNICATION CONVERTER FOR CONNECTING AN AUTOMATION DEVICE TO A COMPUTER AND METHOD FOR CONTROLLING THE COMMUNICATION CONVERTER

This application is a 371 of PCT/EP2010/064668, filed on Oct. 1, 2010, which claims priority to German patent application number 10 2009 044 172.7, filed Oct. 2, 2009, which is incorporated herein by reference.

The invention pertains to a communication converter for connecting automation devices with different operating voltage to a host computer, comprising an interface component for converting of data being transmitted and a transceiver component coupled to the interface component, wherein the interface component is connected at the input side via a host connector to a host interface of the host computer and the transceiver component is connected via a device connector to a device interface of the automation device, as well as a voltage transformer, which is connected at the input side via the host interface to operating voltage and at the output side to a voltage supply line of the device interface, as well as a method for controlling the communication converter for connecting of automation devices having different operating voltages to a host computer, wherein the communication converter has an interface component for converting of the data being transmitted and a transceiver component coupled to the interface component, and wherein the interface component is connected at the input side via a host connector to a host interface of the host computer and the transceiver component is connected via a device connector of the automation device, as well as a voltage transformer, which is connected at the input side via the host interface to operating voltage and at the output side to a voltage supply line of the device interface.

A communication converter of the kind mentioned above as part of a data transmission cable is known, for example, in EP-A-1 598 743. This data transmission cable, which is configured to connect a mobile communication terminal to a computer, comprises a USB connector, which can be connected to a USB port of a personal computer, a terminal connector, which can be connected to a UART port of the mobile communication terminal, a communication converter chip in one of the connectors, which converts the signals from USB to UART, and a plurality of transmission lines that connect the USB connector to the terminal connector.

In the known configuration, the communication converter chip as well as a DC-DC converter chip are integrated in the terminal connector. The data signals of the computer and the communication terminal are transmitted via the communication converter chip between the UART port and the USB port. A voltage source of the USB port is connected to the communication converter chip and to the DC-DC converter chip, while an output of the DC-DC converter provides a d.c. voltage for the UART port.

It emerges from the above that different data transmission cables have to be used for terminal devices with different supply voltages, which is a disadvantage in terms of manufacture, warehousing, and application.

Especially in the field of automation technology there are automation products whose communication interfaces require different voltage levels.

For example, for communication between a personal computer and an automation device one uses a network-compatible interface standard RS485 or EIA 485 for the programming, configuration and monitoring of the automation device. Basically, a communication converter is needed for the connection of the personal computer to the automation product in order to convert the signals of the USB or RS232 interface of the personal computer to the RS485 interface.

The RS485 standard uses a line pair to transmit an inverted and a noninverted level of a 1 bit data signal. The RS485 interface standard specifies only the electrical properties of the interface and does not define any protocol or any connector pin assignment. The protocol can be chosen specific to the application. Since no unified pin assignment of a RS485 connector exists, when using different RS485 devices one must always consult the documentation of the particular device, and consequently device-specific converters and data transmission cables must be used.

If data is to be transmitted, one makes use of the Universal Asynchronous Receiver-Transmitter protocol (UART), which is recognized by RS232 interfaces.

In addition to the communication lines of the RS485 interface already mentioned above, other interface lines for signals can be used, which can optionally be implemented at the device side. When necessary, these can be used, e.g., to place the device in a specific operating mode or to provide a device-specific voltage.

The supporting of these signals is necessary in order to make possible a communication with the dedicated device. Basically, it is not possible to free up all signals for the voltage supply, since the correct voltage value needs to be provided for the particular device.

At present, the management of these signals can be realized in two different ways:
  The settings are controlled by software, which makes the software development more difficult,
  Special cables must be designed to meet the needs of a specific device, which is therefore only compatible with this device type.

US-A-2006/0155908 pertains to an isolation system for the coupling of field bus data to a network. The system comprises a data format converter, which converts the data to USB data. Moreover, the system comprises a coupler, comprising a first isolation barrier, which is connected in cascade with the converter. A host computer receives the USB data. The host computer comprises a data server interface and a network connection. Moreover, a voltage transformer is provided, which couples the power supply between the host computer and the field bus, and the voltage transformer comprises a second isolation barrier.

US-A-2009/0070615 pertains to a multiple voltage supply management system of a power over Ethernet (PoE) system.

The PoE communication system provides PoE to one or more voltage-operated devices, which use one or more DC voltage supplies. For this, the PoE communication system comprises a voltage transformer, which monitors one or more DC voltage supplies based on the dynamic response of one or more devices, making use of power status indicators, which are received via a power bank data interface.

Starting from this, the basic problem of the present invention is to modify a communication converter of the above indicated kind so that it can communicate with devices of different interface standards, such as RS485 and RS232.

The problem is solved according to the invention in that the voltage transformer is configured as a controllable voltage transformer, whose output voltage can be controlled by means of a logic unit integrated in the communication converter in dependence on a signal present on a control line and/or the voltage supply line and detected by the logic unit.

Preferably, the logic unit is configured as a microcontroller, which is controlled by firmware. An updating of the firmware can be done via the USB interface.

Preferably, the communication converter is an integral part of a connection cable, while the communication converter can be integrated in one of the terminal connectors of the connection cable or in the course of the connection cable.

In another preferred embodiment, the host interface can be a USB interface or a Fire Wire (IEEE-1394) interface, while the device interface can be configured as a serial interface per RS485 or RS232 standard.

According to a preferred method, the problem is solved in that a logic unit integrated in the communication converter is used to detect a signal status on the voltage supply line of the device interface and/or a control line of the device interface and the output voltage of the converter is adjusted to the supply voltage of the connected automation device in dependence on the signal of the control line and/or the voltage supply line.

For control of the communication converter, it is necessary to obtain feedback from the automation device, in order to identify and select the suitable voltage. One feedback parameter is the current consumption of the device when it is supplied with a voltage. A second feedback parameter is a CTRL signal on the control line, which has a defined voltage level and is typically used to switch the automation device to a specific operating mode.

For the solution described here, every device supports the CTRL signal in order to allow the converter to recognize this signal and use it as a feedback signal. A defined CTRL voltage value is independent of the rated voltage required on the device side.

The relation between the voltage value applied to the voltage supply line and the voltage value active on the control line CTRL is used to distinguish between different device types.

With increasing supply voltage, the voltage value on the control line will increase until a rated supply voltage is reached. The voltage on the control line then has its defined value.

In order to detect the correct voltage value, the communication converter starts tests with a lowest voltage value that is supported by it and monitors the voltage value on the control line that is measured by the converter on the device side.

When the voltage value on the control line has reached the defined voltage value, the correct supply voltage has been found. If the voltage value on the control line CTRL is >0 Volts and smaller than the defined voltage value, the communication converter increases the supply voltage to the next higher voltage value supported by the converter. The voltage value on the control line is again measured and compared to the defined voltage value. Depending on the outcome of the comparison, either the correct voltage value has been found and is being supplied to the automation device, or the test sequence is again carried out until the correct voltage value is found.

The benefit of a microcontroller-based solution is a "stand-alone solution", which is compatible with different interface implementations, regardless of the use of additional signals. A single communication converter or a single cable with integrated communication converter is provided for many devices, without any influence on the software development. Furthermore, a "plug and play" application is possible, without distortions having to be done by a user.

The core notion of the invention is a single universal and intelligent converter, which recognizes the connected device and provides the corresponding voltage signals.

Further details, benefits and features of the invention will appear not only from the claims and the features found therein—by themselves and/or in combination—but also from the following description of a sample embodiment found in the drawing.

Figure 2:
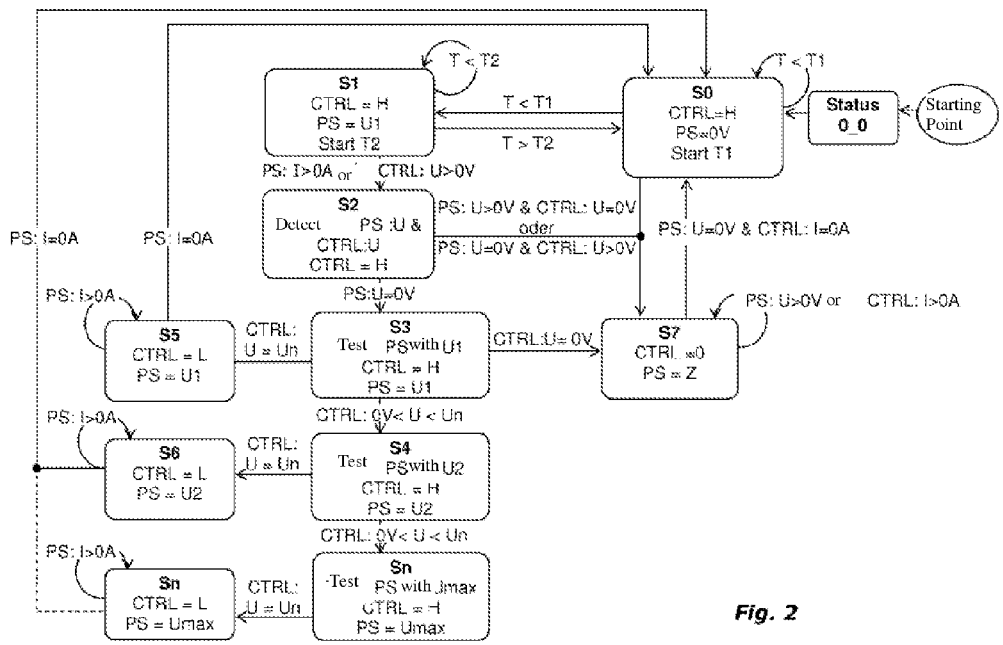
Figure 3:
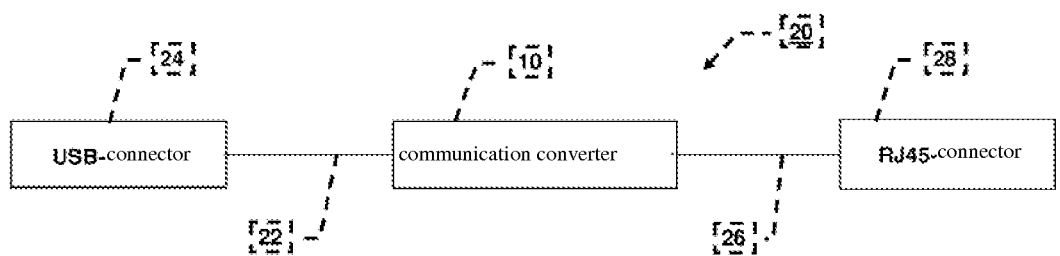

There are shown:

FIG. 1, a schematic block diagram of a communication connection between a personal computer and an automation device FIG. 2, a state diagram for control of the voltage supply and additional signals, and FIG. 3, a schematic representation of a communication cable.

FIG. 1 shows a purely schematic communication converter 10 for connecting a serial device interface 12 such as a RS485 or RS232 interface of an automation device 14 to a host interface 16 such as a USB interface or IEEE1394 interface (FireWire) of a host computer 18.

In the sample embodiment described, the communication converter 10 is an integral part of a communication cable 20, at whose first end 22 a host connector 24 such as a USB connector is connected for connection to the host interface 16 of the host computer 18 and at whose second end 26 a device connector 28 such as a RJ45 connector is provided for connection to the serial device interface 12 of the automation device 14.

The communication converter 10 comprises an interface component 30, which can be connected at the input side to data lines 32 of the host interface 16 and can automatically work off a complete USB protocol. At the output side, the interface component 30 is connected to a serial transceiver component 34, which can be connected via data lines 36 to the serial device interface 12 of the automation device 14.

Both the interface component 30 and the serial transceiver component 34 are supplied with voltage via a voltage supply line 38 of the host interface 16.

In order to enable an automatic adjustment of an operating voltage defined for the automation device 14 connected to the communication converter 10, the communication converter 10 has a logic unit 40, which is preferably configured as a microcontroller. One output 42 of the logic unit 40 is connected to a control input 44 of a voltage transformer 46, which is configured as a controllable DC/DC converter. One output of the voltage transformer 46 can be connected to a voltage supply line PS of the serial device interface 12 in order to supply the automation device 14 with suitable voltage.

At the same time, the output of the voltage transformer 46 is fed back across a first current/voltage meter 48 to an input 50 of the logic unit 40.

In addition to the data transmission lines 36, which can be termed RX/TX lines, the serial device interface 12 additionally comprises the voltage supply line PS and a control signal line CTRL, which is connected to in input 52 of a second current/voltage meter 54, which is connected at the output side to an input 56 of the logic unit 40, in order to detect the current/voltage states of the control line CTRL. Another output 58 of the logic unit 40 is connected to an impedance switch 60, whose output is connected to the control signal line CTRL and which is fed back across the current/voltage meter 54 to the input 56 of the logic unit. By the switching means, such as impedance switch 60, the impedance of the control line 60 can be controlled to a high impedance H or a low impedance L.

For control of the communication converter 20, it is necessary to obtain a feedback from the automation device 14 in order to identify and select the suitable voltage. One feedback parameter is the current consumption of the device 14 when it is supplied with a voltage. A second feedback parameter is a CTRL signal on the control line CTRL, which has a defined voltage level and is typically used to switch the automation device 14 to a specific operating mode.

For the solution described here, every device supports the CTRL signal in order to allow the converter to recognize this signal and use it as a feedback signal. A defined CTRL voltage value is independent of the rated voltage required on the device side.

The relation between the voltage value applied to the voltage supply line PS and the voltage value active on the control line CTRL is used to distinguish between different device types.

With increasing supply voltage, the voltage value on the control line CTRL will increase until a rated supply voltage Un is reached. The voltage on the control line CTRL then has its defined value.

In order to detect the correct voltage value, the communication converter 10 starts tests with a lowest voltage value that is supported by it and monitors the voltage value on the control line CTRL that is measured by the converter 10 on the device side.

When the voltage value on the control line CTRL has reached the defined voltage value, the correct supply voltage has been found. If the voltage value on the control line CTRL is >0 Volts and smaller than the defined voltage value, the communication converter 10 increases the supply voltage to the next higher voltage value supported by the converter 10. The voltage value on the control line CTRL is again measured and compared to the defined voltage value. Depending on the outcome of the comparison, either the correct voltage value has been found and is being supplied to the automation device, or the test sequence is again carried out until the correct voltage value is found.

During the voltage test, the line CTRL is high-impedance. When the communication converter 10 provides the operating voltage on the supply line PS, the control line CTRL is set at low impedance L, in order to provide the signal on the control line CTRL for the connected automation device 14. The current across the supply line PS is monitored and used to detect whether the communication converter 10 has been separated from the automation device 14. If the current drops to 0 amperes, the communication converter 10 has been separated and the communication converter 10 starts the detection process once again.

The function of the communication converter 10 shall now be explained by means of the state diagram shown in FIG. 2.

Beginning at a starting point with state 0_0, it is assumed in a state S0 that the control line CTRL is high impedance H and a voltage U on the voltage supply line PS is 0 volts. A timer T1 is started. If the levels of the lines CTRL and PS do not change, the converter 10 remains in state S0.

In a state S1, using the voltage transformer 46, a voltage value U1 corresponding to the lowest one supported by the converter is placed on the voltage supply line PS and a timer T2 is started.

At the same time, the lines PS and CTRL are monitored by the current/voltage meters 48, 54. If the current on the line PS is >0 amperes or the voltage on the line CTRL is >0 volts, there is a switch to the state S2. Otherwise, it goes back to state S0.

In state S2, the voltage value on the lines PS and CTRL is detected. The lines are switched to high impedance H.

If the voltage on the line PS is >0 volts and on the line CTRL=0 volts or on the line PS=0 volts and on the line CTRL>0 volts, there is a change to the state S7, in which the line PS is switched to high-impedance (no voltage from the converter) and CTRL to low impedance L.

If the voltage in the state S2 on the supply line PS is 0 volts, there is a change to the state S3. The supply line PS draws the voltage U1, while the control line CTRL has a high impedance H. At the same time, the voltage of the control line CTRL is monitored by means of the current/voltage meter 54. Once this voltage is 0 volts, the circuit changes to the state S7.

If the voltage present on the control line CTRL corresponds to the rated voltage Un of the CTRL signal, the circuit switches to the state S5, in which the control line CTRL is set at low impedance Z and the supply line PS at supply voltage U1.

If a current flow across the supply line PS is >0 amperes, the circuit remains in state S5. If the current flow across the supply line PS is 0 amperes, the circuit switches to the state S0.

The state S3 switches to a state S4 when a voltage on the control line CTRL lies between 0 volts≤U≤UN (rated voltage of the CTRL signal). In the state S4, the supply line PS draws a voltage U2 (U2>U1), while the control line CTRL has a high impedance Z.

If the voltage U on the control line corresponds to the rated voltage UN, the circuit switches to the state S6, in which the control line CTRL has a low impedance L and the supply line PS a voltage U2. The circuit remains in state S6 as long as a current flow across the supply line PS is >0 amperes. Otherwise, the circuit switches to state S0.

The states S4 and S6 are carried out according to the desired device voltage, with the goal of applying the suitable voltage U1, U2, . . . , UMAX for the device 14 to the supply line PS.

From the state S7 in which the control line has a low impedance L and the supply line PS the state of 0 volts, the circuit remains in the state S7 if the voltage on the supply line PS is >0 volts or the current I across the control line CTRL is >0 amperes.

If the voltage U of the supply line PS is 0 volts and the current I across the control line CTRL likewise amounts to 0 amperes, the circuit switches to the state S0. The detection sequence is started once again.

In the case of devices that are supplied with voltage from the outside, i.e., that are not supplied with voltage via the communication converter 10, one can distinguish among three different device types:

1) device of type A, which itself provides voltage at the proper interface connection, 2) device of type B, which uses no voltage supply line, but supports additional signals to the device interface, and 3) device of type C, which supports no voltage supply and no optional CTRL signal.

For these three device types, a voltage supply by the communication converter 10 or the communication cable is not necessary. For the device types A and B, the existing voltage supply or the CTRL signal from the communication converter can be used to detect that a voltage supply is not necessary. The voltage supply capability of the communication converter is switched off for devices of this type.

For devices of type C, no feedback signal is available. Thus, the states described in the status diagram would run continuously. Due to the lack of an internal connection of the supply line in this device type, no current will flow. Thus, the voltage testing will be halted after applying the least voltage.

The invention claimed is:

1. A communication converter for connecting automation devices with different operating voltage to a host computer, comprising:

an interface component for converting of data being transmitted;

a transceiver component coupled to the interface component;

wherein the interface component is connectable at the input side via a host connector to a host interface of the host computer, and the transceiver component is connectable via a device connector to a device interface of the automation device; and a voltage transformer connectable at the input side via the host interface to operating voltage, and at the output side to a voltage supply line of the device interface;

wherein an output voltage of the voltage transformer is applied to the voltage supply line and wherein the automation device is supplied with the output voltage via the voltage supply line of the device interface;

wherein the communication converter has a first current or voltage meter to detect a current or a voltage of the voltage supply line, a second current or voltage meter to detect a current or a voltage of a control line of the device interface, and a switching means to control an impedance of the control line, wherein the voltage transformer is configured as a controllable voltage transformer, wherein the output voltage of the voltage transformer is controllable successively in dependence on the voltage value present on the control line, and the voltage value present on the voltage supply line to a higher voltage value by means of a logic unit integrated in the communication converter, and during the consecutive raising of the output voltage, the voltage value on the control line is monitored by the second current or voltage meter, and when the voltage value on the control line reaches a defined voltage value, the necessary operating voltage for the connected automation device is set.

2. The communication converter according to claim 1, wherein an output of the logic unit is connected to a control input of the voltage transformer, and an output of the voltage transformer is fed back across the first current or voltage meter to an input of the logic unit.

3. The communication converter according to claim 1, wherein the control line is connected across the second current or voltage meter to an input of the logic unit.

4. The communication converter according to claim 1, wherein the control line can be controlled via the switching means, such as an impedance switch, across an output of the logic unit from a low impedance to a high impedance, and vice versa.

5. A method for controlling an output voltage of a communication converter for connecting of automation devices having different operating voltages to a host computer, wherein the communication converter has an interface component for converting of the data being transmitted, and a transceiver component coupled to the interface component, and wherein the interface component is connected at the input side via a host connector to a host interface of the host computer and the transceiver component is connected via a device connector of the automation device, and a voltage transformer, which is connected at the input side via the host interface to operating voltage, and at the output side supplies the automation device with the output voltage via a voltage supply line, wherein a logic unit integrated in the communication converter is used to detect a signal status on the voltage supply line of the device interface and a control line of the device interface, and the output voltage of the voltage transformer is adjusted to the operating voltage of the connected automation device in dependence on the voltage values of the control line and the voltage supply line, wherein the output voltage is increased consecutively via the logic unit and the controllable voltage transformer, starting from a low voltage value, while, at the same time, a voltage value is monitored on the control line, and when the voltage value on the control line has reached a defined voltage value, the required operating voltage for the connected automation device is set.

6. The method according to claim 5, wherein a current flow across the voltage supply line is detected by means of a current or voltage meter.

7. The method according to claim 5, wherein a relation between the output voltage of the converter applied to the voltage supply line and a voltage value detected on the control line is used to distinguish between different types of automation devices.

8. The method according to claim 5, wherein the voltage value of the output voltage is increased to a next higher voltage value when the voltage value on the control line is greater than zero volts and less than the defined voltage value.

9. The method according to claim 5, wherein the current across the voltage supply line is monitored and used to detect whether the communication converter has been separated from the automation device.

* * * * *